United States Patent [19]

Munro et al.

[11] 4,009,635
[45] Mar. 1, 1977

[54] HELICOPTER LAUNCH AND RECOVERY DEVICE FOR HORIZONTAL FLOATING ASW MOBILE TARGETS

[75] Inventors: James M. Munro, North Kingstown; David L. Ramstad, Portsmouth, both of R.I.; Paul M. Getty, Sunrise, Fla.

[73] Assignee: The United States of America as represented by the Secretary of the Navy, Washington, D.C.

[22] Filed: Apr. 26, 1976

[21] Appl. No.: 680,621

[52] U.S. Cl. .......................... 89/1.5 G; 244/137 R; 294/66 R; 294/112

[51] Int. Cl.² .......................................... F41F 5/02

[58] Field of Search ............... 294/111, 112, 66 R, 294/83 AB; 244/137 R; 89/1.5 G, 1.5 R

[56] References Cited

UNITED STATES PATENTS

| | | | |
|---|---|---|---|
| 435,839 | 9/1890 | Hunter | 294/112 X |
| 1,093,832 | 4/1914 | Crosby et al. | 294/112 |
| 1,727,942 | 9/1929 | Savini | 294/112 |
| 2,362,268 | 11/1944 | Hall | 294/112 X |
| 2,535,095 | 12/1950 | Schwartz et al. | 89/1.5 G |
| 3,032,365 | 5/1962 | Campbell | 89/1.5 G X |
| 3,733,101 | 5/1973 | Sayre | 294/66 R X |
| 3,805,977 | 4/1974 | Fritzsche et al. | 244/137 R X |
| 3,921,943 | 11/1975 | Munro et al. | 244/137 R |

Primary Examiner—David H. Brown
Attorney, Agent, or Firm—Richard S. Sciascia; Arthur A. McGill; Prithvi C. Lall

[57] ABSTRACT

A system suspended from a helicopter is utilized for unrestricted launching of cylindrical bodies and recovering these bodies while they are floating in a horizontal position. The system comprises a cage having a pair of axially separated U-shaped clamps with panels extending from the open portion of the clamps. Pivotable wedgs protrude to the inside of each clamp, allowing a cylindrical body to slip into the cage and be captured. In addition an electrical circuit is connected to bomb shackles in the system for providing the launch capability.

17 Claims, 4 Drawing Figures

HELICOPTER LAUNCH AND RECOVERY DEVICE FOR HORIZONTAL FLOATING ASW MOBILE TARGETS

STATEMENT OF GOVERNMENT INTEREST

The invention described herein maybe manufactured and used by or for the Government of the United States of America for governmental purposes without the payment of any royalties thereon or therefore.

BACKGROUND OF THE INVENTION

The present invention generally relates to capture and release devices and more particularly to a device for launching and/or recovering mobile targets.

Horizontally floating Anti-Submarine Warfare (ASW) mobile targets represent an integral part of Navy Technical Certification programs (TCP's), which involve various classes of surface ships, submarines and torpedoes. Present methods for launching ASW targets vary from submarine and surface tube firings, to launches from the rear of torpedo retriever boats (TRB's), to inflight release from helicopters. Recovery methods range from surface retrieval craft, to helicopter deployment of drivers with lifting straps, to helicopter use of a snare hook.

Due to range demands and fleet commitments, it is imperative that TCP's function as efficiently as possible with the least number of delays and postponements. In obtaining this desired efficiency, target deployment/recovery techniques and equipment must be independent of adverse weather conditions (e.g. high sea states). Furthermore, they must function in such a way that the programs' results are not influenced by their implementation. For example, one drawback of retriever, submarine and surface tube firings is that the position of the ASW target is often already known at deployment, because of either sonar tracking of the launch craft or reception of the noise due to firing. In addition, surface launch and retrieval is at many times impossible because of prohibitive sea states which can cause equipment damage and injury to personnel.

Use of a helicopter for launch and recovery increases the capability for rapid turnaround of targets, and in most cases decreases the danger to which personnel are exposed. One exception is the deployment of recovery divers with lifting straps, whereas this represents a potentially hazardous situation and requires a special landing procedure to protect the target from damage.

Another system incorporates a bombrack which hard-mounts the target to a helicopter for launch. In flight, the target is released from its hard-mount as the helicopter pitches forward, producing the desired water entry angle. Recovery is accomplished by using a snare hook (i.e. a long pole with a hook end, which is attached to the helicopters' cargo hook). The snare hook is placed through a lifting ring deployed at target end-of-run, and the unit is flown back to be deposited in a specially cushioned landing area.

Air launches, such as the one just described, significantly reduce the amount of noise associated with target deployment, thereby decreasing the chances of discovery by sonar. However, the accomplishment of a successful launch and the safety of the crew depends to a larger measure than necessary to the skill of the helicopter pilot. In the case of capture, not all horizontally floating ASW targets are equipped with, or designed for lifting rings.

SUMMARY OF THE INVENTION

Accordingly, it is a general purpose and object of the present invention to provide a device having improved launching and capturing capabilities. It is a further object that the device be operable from a helicopter for use in launching a target and capturing a horizontally floating target at sea. Another object is that it be suitable to be returned to land without damage to the captured target. Other objects are that the device be light in weight, rugged, durable and dependable in operation, have ease and safety in handling and yield speed and efficiency at relatively low cost.

The above is attained in accordance with the present invention by providing a system suspended from a helicopter that releases a target, at a predetermined angle, on signal from the helicopter for deployment at sea. The system is also capable of capturing the target by the use of adjustable wedges that reposition for holding the target once the target is properly positioned with relation to the system. The target can then be returned to land or a ship having portions of the system function as landing frames.

DESCRIPTION OF THE PREFERRED EMBODIMENTS

Figure 1:
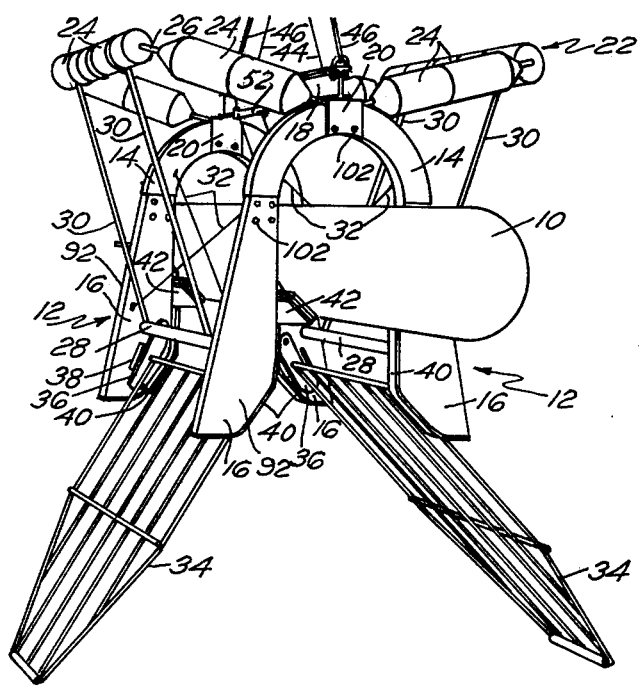
FIG. 1 is a perspective view of the system suspended from a helicopter following a recovery operation.

Referring now to FIG. 1 there is shown a mobile target 10 after capture enclosed in forward and aft U clamps 12. The U clamps 12 comprise an upper semicircular section 14 and legs 16. Two of the legs 16 differ from the other two legs 16 in that they are of opposite hand. This is apparent in the drawing.

The semicircular sections 14 are separated from each other and held in place by means of an I beam strongback 18. The strongback 18 is affixed to section 14 by means of nuts and bolts (not shown) and bracket 20.

A float system 22 has a plurality of floats 24 that are mounted on tubular piece 26. A pair of horizontal tubular pieces 28 are bolted to legs 16. Tubular pieces 30 connect horizontal tubular pieces 28 to tubular piece 26.

Rope cables 32 provide additional support to keep U clamps 12 from separating. The cables 32 are in tension for providing this support. Turnbuckles can be connected to the rope cables 32 for providing adjustable tension is necessary.

Skirts 34, comprised of tubular grids welded together are rigidly connected to flat plates 36. The plates 36 are rotatably connected to legs 16. A slot 38 is located on the inner surface of each of the legs 16. The flat plates 36 are free to rotate back and forth, but have an inward stop provided by welded inner plates 40 on legs 16.

Wedges 42 grip target 10 from its underneath portion. The wedges 42 are operated by recovery control lines 44. Main lifting lines 46 are connected to strongback 18.

Figures 2, 4:
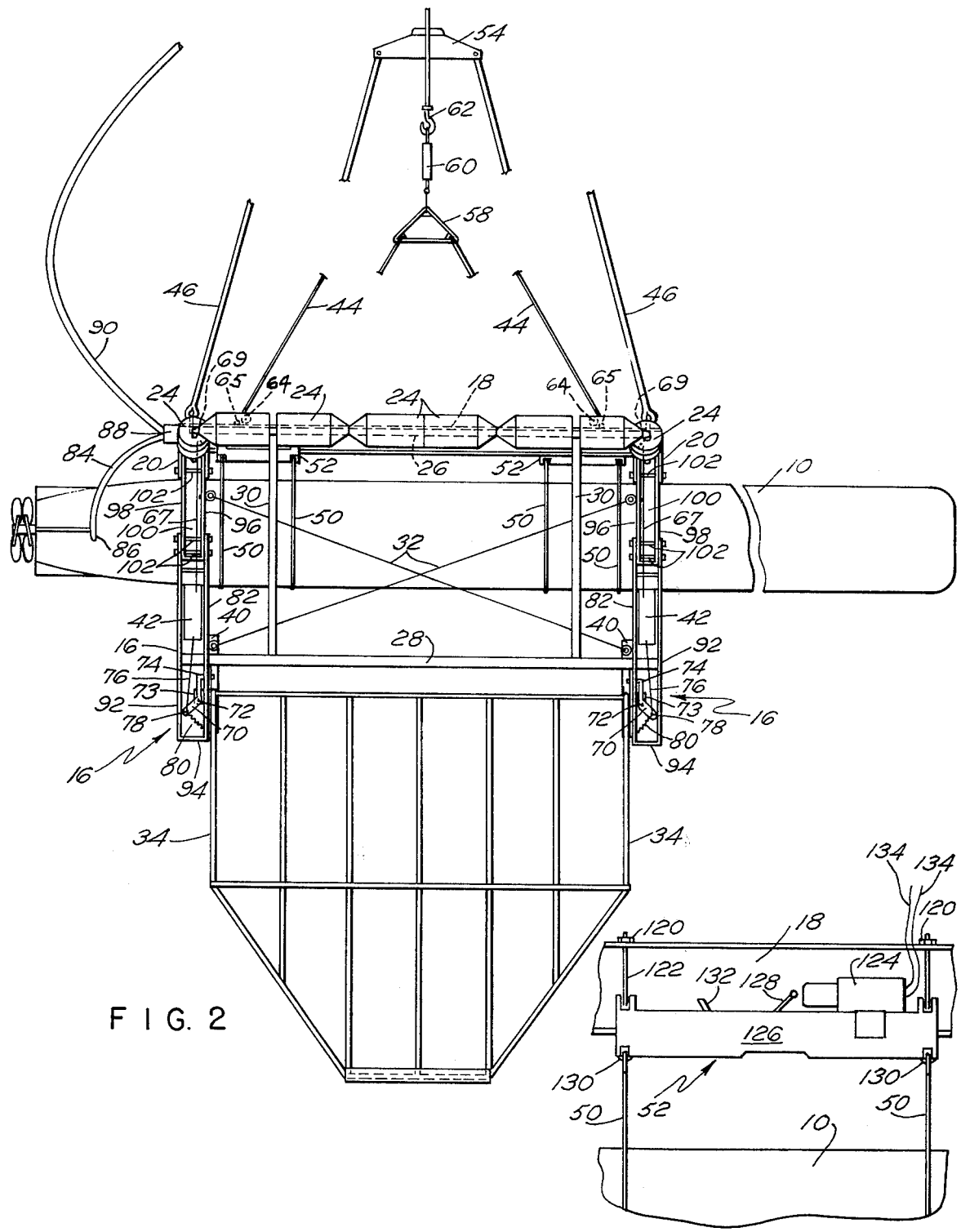
FIG. 2 is a side view of the system of FIG. 1 as it appears suspended from a helicopter prior to launch.
FIG. 4 is an enlarged side view of the bomb shackle of FIG. 2.

FIG. 2 is a side view showing the device in the launch mode. The mobile target 10 is held in place by lines 50 respectively held by two bomb shackles 52. The bomb shackles 52 are supported on either end and opposite sides of strongback 18. When the system is used for recovery purposes only the bomb shackles 52 need not be included. The main lifting lines 46 are connected from yoke 54 to strongback 18. Yoke 54 connects to the helicopter cargo hook (not shown).

The recovery control lines 44 connect to an orientation control triangle 58 which in turn is connected to a weak link 60. The weak link 60 comprises a strip of metal or a shear pin. As the name implies the weak link 60 ruptures if called upon to support the structure if a fault occurs as great as or greater than the breaking of one of the main lifting lines 46. The weak link 60 connects to rescue hoist 62 which in turn is controlled from a helicopter (not shown). The recovery control lines 44, in addition, connect to respective sheaves 64. The sheaves 64 have rings 65 connected thereto. Lines 67 extend from rings 65, around sheaves 69, to wedges 42. The wedges 42 are raised in the launch mode as shown in FIG. 2 by applying tension to the recovery control lines 44 and lowered by releasing tension as shown in FIG. 1.

The lower part of each leg 16 has a bell crank 70 having a fulcrum 72 connected to a piece 73 so as to have an end 74 protrude through slot 38 upon the raising of a wire 76. The wire 76 is connected from the wedge 42 to an aperture 78 in bell crank 70. A retaining spring 80 connected between an inner plate 82 of 16 and bell crank 70 holds bell crank 70 in the inactivated position upon release of tension on wire 76. Upon the wedge 42 being raised the end 74 of bell crank 70 protrudes through slot 38 to provide a stop for skirt panel 34 so that a predetermined angle is maintained between the two skirt panels 34.

A typical breakaway electrical cable 84 having a finger section 86 is connected to target 10. Upon tension being placed upon section 86 by the release of target 10 the cable 84 separates from target 10 in a well known manner. The cable 84 connects to an electrical junction box 88. An electrical cable 90 connects junction box 88 to the helicopter. Box 88 receives signals from the helicopter that are supplied to the bomb shackles 52 and the target 10. The signals to target 10 are for presetting instrumentation that is well known and not within the scope of the present invention.

The legs 16 of U clamp 12 are each comprised of an inner plate 82, outer plate 92 and connecting plate 94. The inner connecting plate 94 does not run the entire length of leg 16 due to an inner opening necessary for operation of wedge 42. The plate 94 is welded to both inner and outer plates 82 and 92, respectively, and protrudes slightly beyond inner plate 82 for providing a positive stop for skirt 34 at all times.

The semicircular section 14 of each U clamp 12 comprises inner and outer plates 96 and 98, respectively, and connecting plate 100. The connecting plate 100 is welded to the inner circumferential surface of plates 96 and 98 and extends the entire length of plates 96 and 98. Nuts and bolts 102 connect bracket 20 to section 14 and leg 16 to section 14. The bolt 102 can be provided with inner collars or nuts for giving additional support to hold their respective plates 82, 92 and 96, 98 separated.

Figure 3:
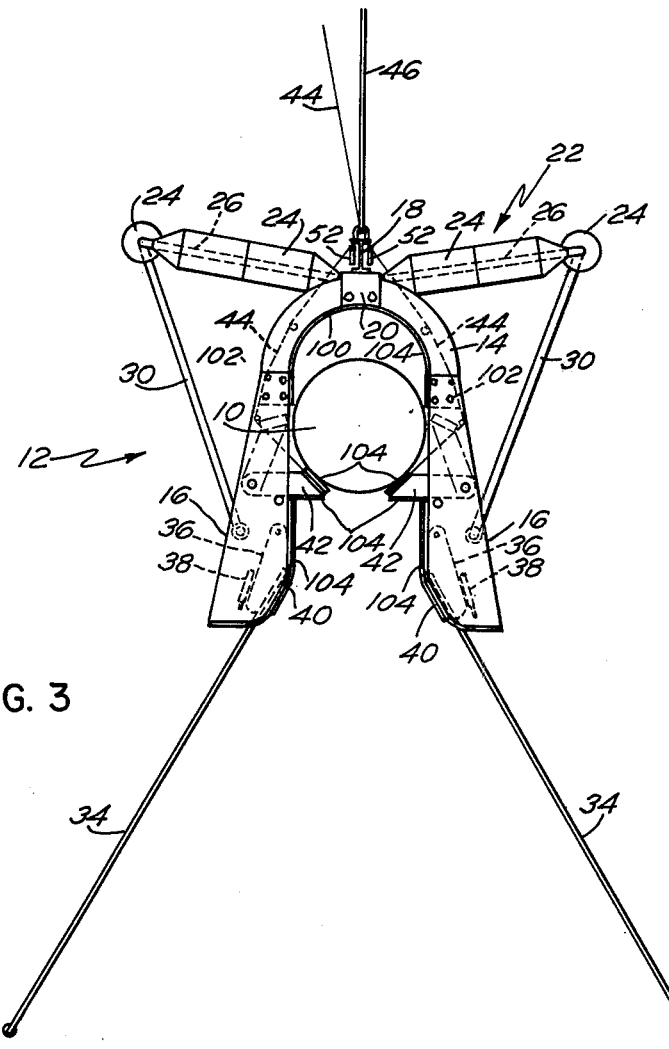
FIG. 3 is a front view of the system of FIG. 1 as it appears suspended from a helicopter following recovery.

FIG. 3 is a front view of the system following a recovery operation. The wedges 42 are lowered for holding the target 10. A cork and rubber compound 104 extends along the entire inner surface of each of the U clamp 12 for cushioning purposes to prevent damage to the target 10. The compound 104 can be affixed to the U clamp by cementing or any other well known method. The compound 104 extends along two surfaces of the wedges 42 so as to provide cushioning in either the launching or recovery position.

FIG. 4 shows one of the typical bomb shackles 52 mounted to the strongback 18 by means of nuts 120 and bolts 122. A solenoid 124 is mounted to the frame 126 of bomb shackle 52 at a position so that energization of the solenoid 124 fires trigger 128. Lines 50 that hold target 10 are held by hooks 130. Upon firing trigger 128 the hooks 130 release dropping target 10 and lines 50 in a manner well known in the art. A reset switch 132 is provided for resetting the position of hooks 130. Electrical wires 134 supply the electrical energy to solenoid 124 for actuation purposes. The wires 134 are controlled from the helicopter and are connected to the solenoids through cable 90 and junction box 88.

In launch operation the orientation triangle is raised causing wedges 42 to lift up and be enclosed by U clamp 12. This provides a clearance path for the launching of target 10. The target 10 is secured by lines 50 that are held by bomb shackle 52. In the actual launch the solenoids 124 that release the target 10 are normally actuated sequentially with a time delay used for the aft bomb shackle solenoid 124. This gives target 10 an appropriate water entry angle.

In recovery operation the wedges 42 are raised during the first part of the capture to enable the forward and aft U clamps to enclose the target 10 as the system is lowered over target 10. At this time the raising of the wedges 42 causes the end 74 of bell crank 70 to protrude through slot 38 so that skirt panels 34 maintain a predetermined angle. Following the enclosure of target 10 the wedges 42 are lowered to hold the enclosed target 10.

There has therefore been shown a system suitable for both launching and recovering targets at sea. The system is self sufficient without utilization of personnel, in the sea, for assistance. In operation the system is suspended from a helicopter that uses either a ship or land for its home base. The system has thus far proven to be safe, quick and reliable in the performance of all expected functions.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A launch system for mobile targets comprising:
    a U frame structure having a plurality of separated U clamps and a strongback connecting said U clamps;
    suspension means connected to the front and rear portions of said strongback for suspending said U frame;
    bomb shackle means connected to said U frame structure having a plurality of bomb shackles with wire cable attached to said bomb shackles, said wire cables adapted for encircling and holding a mobile target, said bomb shackle means adapted for releasing said wire cables; and an electrical cable system having a first plurality electrical conductors connected to said bomb shackles and a second plurality of electrical conductors adapted to make a breakaway connection with the mobile target.

2. A launch system for mobile targets according to claim 1 further comprising steel wire rope cables interconnecting respective U clamps.

3. A launch system for mobile targets according to claim 2 wherein said suspension means further comprises:
- a yoke; and
- a first and second steel cable connected respectively from either side of said yoke to the front and rear portions of said strongback.

4. A recovery system for horizontally floating mobile targets comprising:
- a U frame structure having a plurality of separated U clamps and a strongback connecting said U clamps, said structure adapted for enclosing a mobile target at the top and side portions of the mobile target for a plurality of segments of the targets length, said U clamps further having apertures at the interior portion of the U clamp legs;
- first suspension means connected to the front and rear portions of said strongback for suspending said U frame structure;
- a pair of adjustable wedges connected to each of said U clamps, said wedges adjustable to be either enclosed by said U clamps or to protrude through said apertures in said U clamp legs;
- second suspension system means connected to said wedges for adjusting said wedges from the inserted to the protruded position and vice-versa; and
- a pair of skirt panels with each of said skirt panels connected to opposing legs of said U frame to form an opening between said panels.

5. A recovery system for horizontally floating mobile targets according to claim 4 further comprising steel wire rope cables interconnecting respective U clamps.

6. A recovery system for horizontally floating mobile targets according to claim 5 further comprising a float system connected to said U frame.

7. A recovery system for horizontally floating mobile targets according to claim 6 further comprising:
- a slot located in the inner portions of each leg of each U clamp;
- a skirt panel stop connected to each of said U clamps legs each of said stops adjustable to be either enclosed by said U clamps or to protrude through said slot in each of said U clamps; and
- linking means connecting each skirt panel stop respectively to one of said wedges.

8. A recovery system for horizontally floating mobile targets according to claim 7 wherein said first suspension means further comprises:
- a yoke; and
- a first and second steel cable connected respectively from either side of said yoke to the front and rear portions of said strongback.

9. A recovery system for horizontally floating mobile targets according to claim 8 wherein said second suspension means further comprises:
- an orientation control triangle;
- a weak link of predetermined strength connected to said orientation triangle;
- a first wire connected to said weak link, said first wire adapted to be suspended from overhead;
- a first plurality of sheaves having attached rings;
- a second wire connected from said orientation triangle around said first plurality of sheaves back to said orientation triangle and again connecting with said orientation triangle;
- a second plurality of sheaves; and
- third, fourth, fifth and sixth wires connecting from respective members of said rings of said first plurality of sheaves around respective members of said second plurality of sheaves to respective wedges.

10. A recovery system for horizontally floating mobile targets according to claim 9 wherein each of said skirt panels comprise a plurality of interconnected tubes.

11. A launch and recovery system for mobile targets comprising:
- a U frame structure having a plurality of separated U clamps and a strongback connecting said U clamps, said U clamps further having apertures at the interior of the U clamp legs;
- first suspension means connected to the front and rear portions of said strongback for suspending said U frame structure;
- a pair of adjustable wedges connected to each of said U clamps; said wedges adjustable to be either enclosed by said U clamps or to protrude through said apertures in said U clamp legs;
- second suspension means connected to said wedges for adjusting said wedges from the inserted to the protruded position and vice-versa;
- a pair of skirt panels with each of said skirt panels connected to opposing legs of said U frame to form an opening between said panels;
- bomb shackle means connected to said U frame structure having a plurality of bomb shackles with wire cables attached to said bomb shackles; said wire cables adapted for encircling and holding a mobile target, said bomb shackle means adapted for releasing said wire cables; and
- an electrical cable system having a first plurality of electrical conductors connected to said bomb shackles and a second plurality of electrical conductors adapted to make a breakaway connection with the mobile target.

12. A launch and recovery system for mobile targets according to claim 11 further comprising steel wire rope cables interconnecting respective U clamps.

13. A launch and recovery system for floating mobile targets according to claim 12 further comprising a float system connected to said U frame.

14. A launch and recovery system for floating mobile targets according to claim 13 further comprising:
- a slot located in the inner portions of each leg of each U clamp;
- a skirt panel stop connected to each of said U clamps legs, each of said stops adjustable to be either enclosed by said U clamps or to protrude through said slot in each of said U clamps; and
- linking means connecting each skirt panel stop respectively to one of said wedges.

15. A launch and recovery system for mobile targets according to claim 14 wherein said first suspension means further comprises:
- a yoke; and
- a first and second steel cable connected respectively from either side of said yoke to the front and rear portions of said strongback.

16. A launch and recovery system for mobile targets according to claim 15 wherein said second suspension means further comprises:

an orientation control triangle;

a weak link of predetermined strength connected to said orientation triangle;

a first wire connected to said weak link, said first wire adapted to be suspended from overhead;

a first plurality of sheaves having attached rings;

a second wire connected from said orientation triangle around said first plurality of sheaves back to said orientation triangle and again connecting with said orientation triangle;

a second plurality of sheaves; and third, fourth, fifth and sixth wires connected from respective members of said rings of said first plurality of sheaves around respective members of said second plurality of sheaves to respective wedges.

17. A launch and recovery system for mobile targets according to claim 16 wherein each of said skirt panels comprise a plurality of interconnected tubes.

* * * * *